United States Patent

Okino

[11] Patent Number: 6,043,907
[45] Date of Patent: Mar. 28, 2000

[54] METHOD FOR READING IMAGES AND APPARATUS THEREFOR

[75] Inventor: Yoshiharu Okino, Kanagawa, Japan

[73] Assignee: Fuji Photo Film Co., Ltd., Kanagawa, Japan

[21] Appl. No.: 08/984,133

[22] Filed: Oct. 3, 1997

[30] Foreign Application Priority Data

Mar. 28, 1997 [JP] Japan .................................. 9-078099

[51] Int. Cl.⁷ ........................................................ H04N 1/04
[52] U.S. Cl. ..................... 358/475; 358/474; 358/480; 358/487; 358/505; 358/506; 358/509
[58] Field of Search ........................... 358/474, 475, 358/480, 481, 509, 501, 502, 505, 506, 487

[56] References Cited

U.S. PATENT DOCUMENTS 5,457,007  10/1995  Asami .................................... 430/363
5,573,894  11/1996  Kodama et al. ....................... 430/394

FOREIGN PATENT DOCUMENTS 0 762 201 A1   3/1997   European Pat. Off. .......... G03C 7/30
0762201        3/1997   European Pat. Off. .......... G03C 7/30

*Primary Examiner*—Edward L. Coles
*Assistant Examiner*—Mark Wallerson
*Attorney, Agent, or Firm*—Sughrue, Mion, Zinn, Macpeak & Seas, PLLC

[57] ABSTRACT

The density of cyan color of an image at the peak wavelength $\lambda_{C1}$ in the spectral absorption distribution of a developed cyan color dye is detected in the density range of 0–2 as a detection range, and the density of the developed cyan color dye at the wavelength $\lambda_{C2}$ deviated from the peak wavelength is detected in the density range of 1–1.75 as a detection range. The density equivalent to the density value detected at the peak wavelength $\lambda_{C1}$ in the density range of 2–3.5 is obtained by doubling the density value detected in the density range of 1–1.75 as the detection range. By using the density value thus obtained and the density value detected in the range of 0–2, the cyan color density of the image is obtained in the density range of 0–3.5 as a detection range. Similarly, the density of each color of magenta and yellow is determined. By doing this, the color image can be read accurately by using an apparatus with simple structure.

17 Claims, 9 Drawing Sheets

F I G. 3
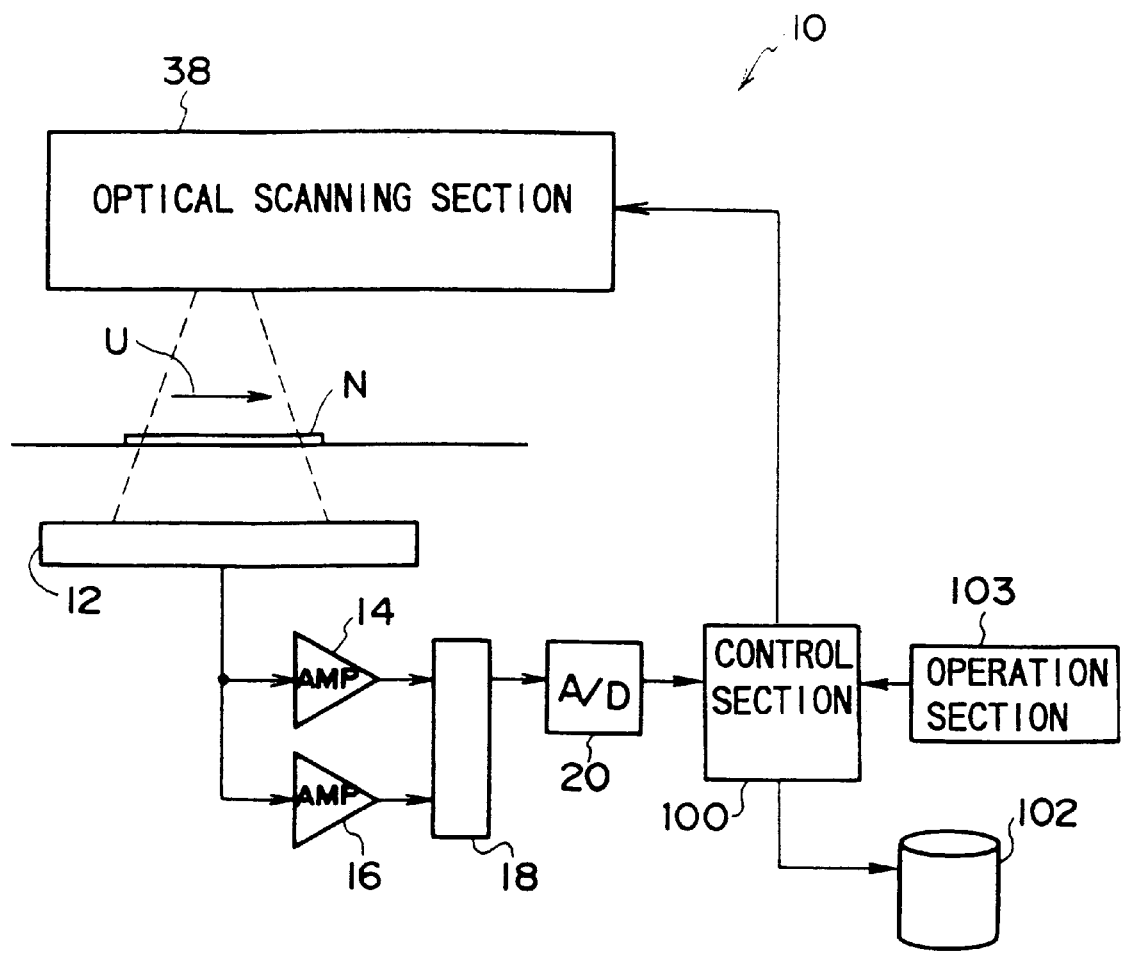

F I G. 5
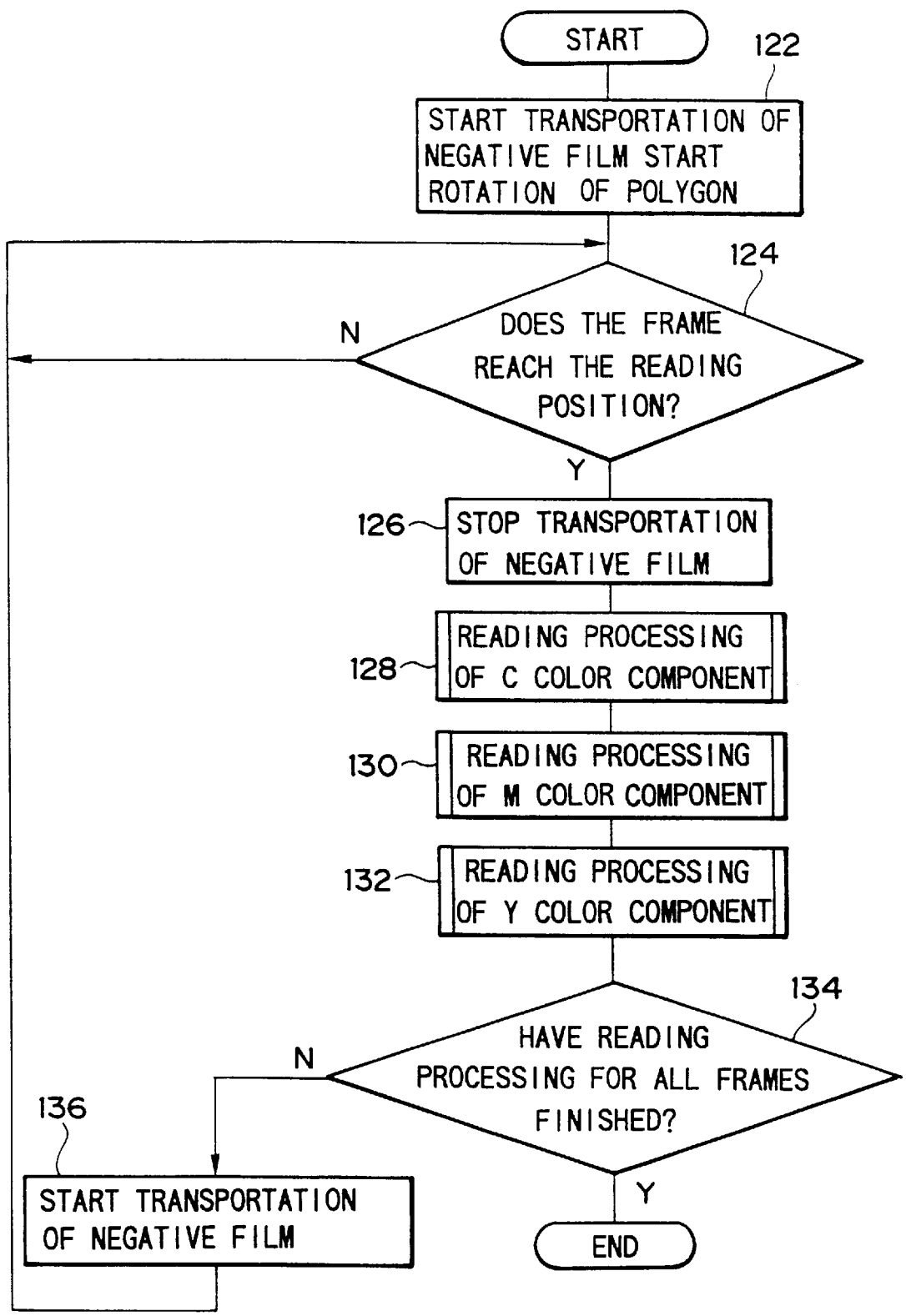

F I G. 7
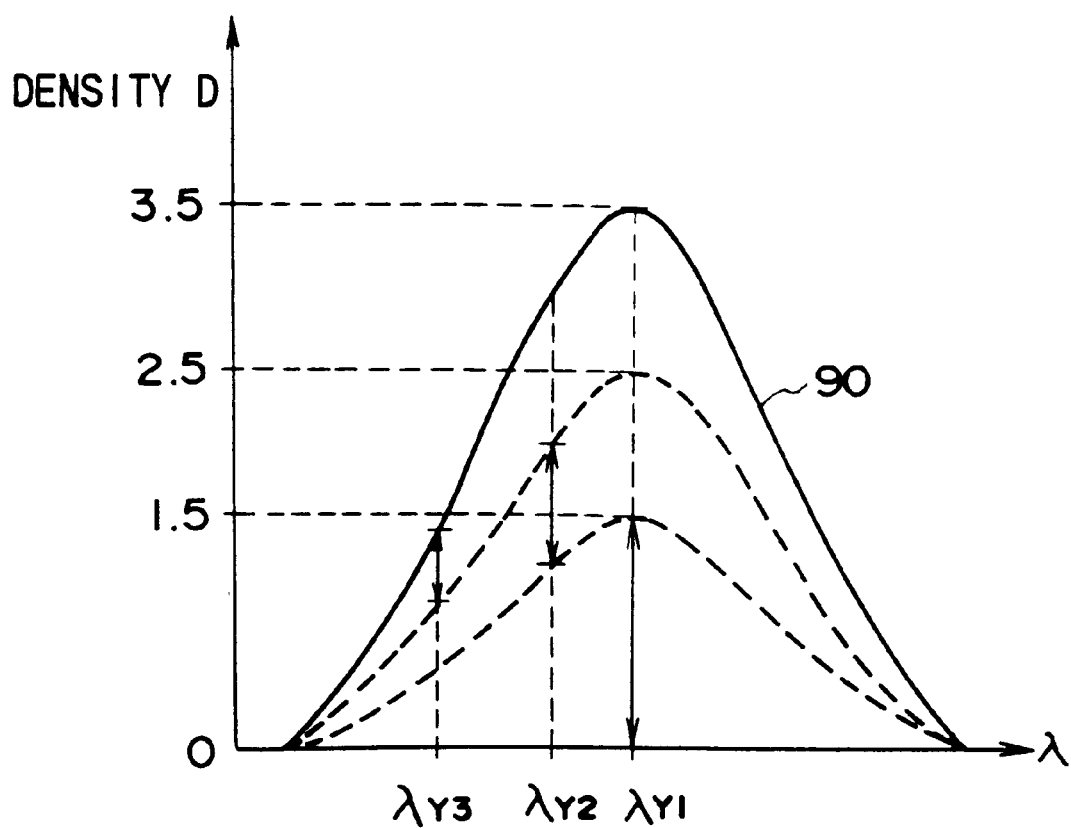

ously on cyan color coated superposed

METHOD FOR READING IMAGES AND APPARATUS THEREFOR

BACKGROUND OF THE INVENTION

1. Field of the Invention

The present invention relates to a method for reading images and an apparatus for reading images and more specifically, to a method for reading images and an apparatus for reading images recorded on an original.

2. Description of the Prior Art

Conventionally, there have been widely used photosensitive materials such as color negative films, color reversal films for recording color images, each having a three layer structure comprising a blue sensitive emulsion layer containing a yellow dye-forming coupler to form yellow color, a green sensitive emulsion layer containing magenta dye-forming coupler to form magenta color, and a red sensitive emulsion layer containing cyan dye forming cyan dye-forming coupler to form cyan color coated superposedly on a support.

Conventionally, there have been used methods for reading color images recorded on these photosensitive materials, in which each of the developed cyan, magenta, and yellow dye images is irradiated with light having wavelengths at which each of these dyes has a high absorbance, so as to detect light quantities transmitted through or reflected from these dye images so that light absorbance of each color developed dye can be calculated to obtain the density of each color image.

On the other hand, the spectral absorbance characteristics of the developed color dyes are not flat, as shown in FIG. 1, and vary with wavelength of light, with the maximum density of 3.5 at the wavelength where the absorbance of each developed color dye has a peak.

Therefore, in order to read the color image in a good quality by using the above described method, it was necessary to determine the density of each color at a density of 3.0, or more preferably at the maximum density of 3.5, at a high SN ratio (for example, 60 dB at minimum, preferably 70 dB or more).

However, conventionally, to determine the density of each color of the color images to the density of at least 3.0 at a high SN ratio, it was necessary to process using expensive circuit parts over a long period of time.

SUMMARY OF THE INVENTION

This invention was made to solve the above problems, and an object of the present invention is to provide a method for reading an image and an apparatus for reading an image which can read color image to a high density at a high SN ratio efficiently with a simple construction of the apparatus.

FIG. 1 shows the spectral absorption characteristic of each developed color dye in a photosensitive material such as a color negative film and the like having layers containing developed color dyes of each color of cyan, magenta, and yellow, in each respective layer. In FIG. 1, curve 90 shows the spectral absorption characteristics of a developed yellow color dye, curve 92 shows the spectral absorption characteristic of a developed magenta color dye, and curve 94 shows the spectral absorption characteristic of a developed cyan color dye, respectively.

The density D on the ordinate is normalized in accordance with the absorbance such that the maximum density is 3.5 as a reference where the absorbance has a maximum value. Consequently, the absorbance and the density has a relationship in that the density decreases as the absorbance of the developed color dye decreases.

FIG. 2 shows the spectral absorption characteristics of the developed yellow color dye. In FIG. 2, the density range which is detectable at the peak wavelength $\lambda_{Y1}$ is 0 to 3.5, and has a wide dynamic range, but when the density range deviates from this peak wavelength range $\lambda_{Y1}$, the density range varies in such a manner that the dynamic range decreases from 0 to 2 or 0 to 1 in comparison with the density range at the peak wavelength $\lambda_{Y1}$. In general, these density ranges can be deemed to vary with approximate similar figures.

That is, because as shown in FIG. 2, the density range of 0 to 1.75 at the wavelength $\lambda_{Y2}$ is ½ of the density range of 0–3.5 at the wavelength $\lambda_{Y1}$, the detected value of the density at the wavelength $\lambda_{Y2}$ becomes ½ of the detected value of the density at the wavelength $\lambda_{Y1}$. That is, when the density of an identical image is detected, the detected value at the wavelength $\lambda_{Y1}$ has the two-fold accuracy over the detected value at the wavelength $\lambda_{Y2}$.

Accordingly, for example, the high density range of 2–3.5 at the wavelength $\lambda_{Y1}$ can be determined by doubling the density detected at the high density range of 1–1.75 at the wavelength $\lambda_{Y2}$. That is, a predetermined density range at the wavelength $\lambda_{Y1}$ where the absorbance has a maximum, for example, the density at the density range of from 2 to 3.5 can be detected in the wavelength $\lambda_{Y2}$ other than the wavelength $\lambda_{Y1}$.

The density detection technique can be app lied not only to the density detection of the images recorded on the photosensitive material such as color negative films and the like, with layers containing developed color dyes of cyan, magenta and yellow colors in each respective layer, but also to the density detection of the images recorded on a regular recording paper and the like.

Thus, in order to achieve the above objects, a first embodiment is a method for reading the density of each color of color images recorded on an original, comprising the steps of: irradiating the original with a plurality of light groups containing a plurality of lights having different wavelength ranges different from each other, each of which corresponds to each color, and wherein each of the wavelength regions of the plurality of the light groups is contained in the absorption wavelength region of a developed color dye having a color which corresponds to the wavelength region, detecting the quantity of light reflected from the original or the quantity of light transmitted through the original for each wavelength region, and determining the density of each color of the image of the original on the basis of the detected quantity of light.

The second embodiment is a method for reading the density of each color of a color original image recorded on a photosensitive material containing developed cyan, magenta and yellow color dyes comprising the steps of: irradiating the original with each of a plurality of light groups which corresponds to each of the colors, and which contains a first light in a predetermined wavelength range containing a wavelength at which the absorbance of the developed color dye is maximum, and a second light outside the predetermined wavelength range, detecting the quantity of light reflected from the original image or the quantity of light transmitted through the original image for each wavelength range, and determining the density of the first density range lower than a predetermined density value for each color based on the quantity of light detected by the irradiation of the first light, and determining the density of the second density range exceeding the predetermined density value for each color based on the quantity of light detected by the irradiation of the second light.

The third embodiment is an image reading apparatus for reading the density of each color of a color image recorded on an original, comprising: a scanning means for scanning the original using a plurality of light groups which contains a plurality of lights having wavelength regions different from each other, each of which corresponds to each color, wherein each of the wavelength ranges is contained in the absorption wavelength region of a developed color dye having a color which corresponds to the wavelength region, a photoelectric converting element for detecting the quantity of light reflected from the original or the quantity of light transmitted through the original for each wavelength region, and an arithmetic operation unit for computing the density of each color of the image of the original based on the detected quantity of light.

That is, in the present invention, an original is irradiated with a plurality of light groups which correspond to each color, contain a plurality of lights having wavelength region different from each other, and which is contained in the absorption wavelength region of the developed color dye corresponding to the wavelength region, the light reflected from the original or the quantity of light transmitted through the original is detected for each wavelength range, and the density of each color of the image of the original is determined based on the detected light quantity.

In the present invention, at least one of the plurality of lights contained in each light group may be a first light in a wavelength region within a predetermined region which contains the wavelength at which the absorbance of a developed color dye corresponding to the wavelength region is maximum and the light other than the above plurality of lights may be the light containing a second light having a wavelength region outside the predetermined range.

In this case, based on the quantity of light detected by the irradiation of the first light, the density of the first density range lower than the predetermined density of each color can be determined, and, based on the quantity of light detected by the irradiation of the second light, the density of the second density range higher than the predetermined range of each color can be determined.

The wavelength region outside the predetermined region is preferably contained only within the absorption wavelength region of the developed color dye corresponding to the wavelength region.

For example, it is possible to irradiate an original image with light $\lambda_{C1}$ in the wavelength region in the vicinity of the wavelength where the absorbance in the absorption wavelength region of a developed cyan color dye as shown in FIG. 1 is maximum and the light $\lambda_{C2}$ in the wavelength region deviated from the absorption maximum to read the image of the original.

In addition, in the same manner for other colors, for example, it is possible to irradiate an original with light $\lambda_{M1}$ in the wavelength region in the vicinity of the wavelength where the absorbance in the absorption wavelength region of a developed magenta color dye as shown in FIG. 1 is maximum and the light $\lambda_{M2}$ in the wavelength region deviated from the absorption maximum to read the image of the original. It is also possible to irradiate an original with light $\lambda_{Y1}$ in the wavelength region in the vicinity of the wavelength where the absorbance in the absorption wavelength region of a developed yellow dye is maximum and the light deviated $\lambda_{Y2}$ from the absorption maximum to read the image of the original.

Now, as described above, in the spectral absorption characteristics of a developed color dye, when the absorbance deviates from the wavelength region where the absorbance is maximum, the density range of the dye varies, for example, from 0 to 2, 0 to 1, or the like. However, since, in general, the density range can be deemed to vary with approximate similar figures, it is possible to convert the results obtained by reading the original image in two or more wavelength regions (in the above example, two wavelength regions) which are different from each other for each color as described above into the results read at the maximum density 0–3.5 in the peak wavelength region. That is, based on the results read in the above two or more wavelength regions which are converted into the read results of the maximum density range of 0–3.5, it is possible to accurately determine the density for each color of the image.

According to the present invention, it is not necessary to read the image (to determine the density of each color of the image) in one wavelength region for determining a density in the maximum density range of 0–3.5 as in the conventional cases. Accordingly, it is not necessary to carry out a time-consuming image reading using expensive special circuit parts, so that it is possible to read the image efficiently with a simple construction of the apparatus.

In the present invention, a plurality of wavelength regions which are different from each other for each color are not necessarily included in the wavelength region within a predetermined region containing the wavelength where the absorbance is maximum.

However, in the present invention, a plurality of different wavelength regions for each color can be included in the wavelength region where changes in detected values is larger than the change in densities of a developed color dye, i.e. the wavelength region within a predetermined wavelength region including the wavelength where the absorbance is maximum, preferably, where wavelength region in the vicinity of the wavelength of the maximum absorbance, so that reading accuracy similar to reading accuracy in the maximum density range of 0–3.5 or in an approximate density range thereto can be obtained and the reading accuracy can be improved.

In the present invention, the density can be determined in two wavelength regions for each color to read a color image.

In this case, an original is irradiated with the light of the wavelength region within a predetermined region including the wavelength where the absorbance is maximum in the spectral absorption distribution of the developed color dyes of the original, preferably the light in the wavelength region in the vicinity of the wavelength where the absorbance is maximum, and the density for each color of the image is detected as a detection range in the first density range (for example, density range 0–2) lower than a predetermined density. Next, the original is irradiated with the light of the wavelength region outside the predetermined range containing the wavelength where the absorbance is maximum, and the density of each color of the image is detected as a detection range in the second density range (for example, density range 1–1.75) corresponding to the density range higher than the predetermined density.

Thereafter, the detected results (density) for each color of the image in the wavelength region outside the predetermined region containing the wavelength where the absorbance is maximum are converted to the detection results at the wavelength region within the predetermined region containing the wavelength where the absorbance is maximum. For example, the results detected in the density range (1–1.75) as the second density range are doubled to obtain the detection results at the density range (2–3.5) in the wavelength region within the predetermined region containing the wavelength where the absorbance is maximum.

In addition, based on the detection results for each color converted in the above manner and the detection results for each color in the first density range detected as above as the detection range, the image density in the maximum density range (in the wavelength region where the detection accuracy is the highest) for each color as the detection range can be obtained.

In the above-mentioned embodiment, for example, when an apparatus is used to detect the density by digitizing a predetermined density range with 12 bits, the density range of 1–1.75 as the detection range at the wavelength region $\lambda_{C2}$ is digitized with 12 bits and the density range of 0–2 as the detection range at the wavelength region $\lambda_{C1}$ is digitized with 12 bits, it means that the density of each color of the image is obtained by digitizing with 13 bits in the maximum density range of 0–3.5 as the detection range. Accordingly, the density can be determined with a higher accuracy than the case where the density is determined by digitizing with 12 bits in the maximum density range of 0–3.5 as a detection range in the peak wavelength region $\lambda_{C1}$ as in the conventional manner.

Accordingly, the maximum density range of 0–3.5 is divided into a plurality of ranges and the density of each color is determined in a small divided detection range, so that the image can be read with a high accuracy at high resolution (that is, at high SN ratio).

Now, in order to digitize the density range of 0–3.5 in 12 bits, it is necessary to electrically distinguish between 3.5 and $(3.5\times(1-1/4096))$ at the maximum density. This means that it is necessary to distinguish between the signal of the detection value "0.00031623" corresponding to the density of 3.5 and the signal of the detection value "0.00031685" corresponding to density of $D=(3.5\times(1-1/4096))$ as a reference with the density D=0, and the accuracy of "0.00000062" is required.

On the other hand, in order to digitize the density range of 1–1.75 in 12 bits, it is only necessary to distinguish between the signal of detection value "0.17783" corresponding to D=1.75 and the signal of the detection value "0.17790" corresponding to $D=(1.75-(1.75-1)/4096)$ as a reference with density of 1, and the accuracy of "0.000075" is enough.

That is, the accuracy by a factor of about 120 times lower than the circuit accuracy is permitted.

Because it becomes possible to detect the density for each color using the light of the wavelength region in which the change in the detected value is larger with respect to the change in the density of a developed color dye by detecting the density as a detection range in the first density range using the light of the wavelength region within the predetermined region containing the wavelength where the absorbance is maximum, it is possible to highly accurately detect the density of a low to medium density range where a high resolution in gradation is required.

On the other hand, with respect to the second density range corresponding to the density higher than the predetermined density, because the density is detected by using the light of the wavelength region outside the predetermined region containing the wavelength where the absorbance is maximum, that is, the wavelength region where the absorbance deviates from the maximum value, the density range to be detected shifts to the medium density range. Consequently, expensive special circuit parts are not required for detection, and the density can efficiently be detected with a simple construction of the apparatus.

In the present invention, because it is possible to detect density by shifting a high density range to a low density range, with increasing deviation between the maximum value $D_1$ of the density in the wavelength region within the predetermined region containing the wavelength where the absorbance becomes a peak in the spectral absorption distribution and the maximum value $D_2$ of the density in the wavelength region outside the predetermined region, i.e., in the wavelength region deviated from the peak, the density can efficiently be detected with a simple apparatus construction. Specifically, the deviation between the maximum $D_1$ and the maximum $D_2$ is preferably 0.5 or more. When the deviation between the maximum value $D_1$ and the maximum value $D_2$ is 1 or more, the above effects are further enhanced.

In the present invention, in the spectral absorption distribution of each developed color dye of an original with a recorded image therein, the density range is regarded to change in similar figures, with being apart from the peak wavelength region (for example, the wavelength region $\lambda_{Y1}$ in FIG. 2). However, there are cases in which the density range does not always change in similar figures in a certain original with being apart from the peak wavelength region.

For this kind of originals, it is possible to convert the density to the detection results of the density at the peak wavelength region as stated above by storing in advance information of spectral absorption characteristics as shown in the diagram of FIG. 1 in a look-up table (LUT), and the like, with reference to the information of the stored spectral absorption characteristics.

Now, as shown in FIG. 1, in the spectral absorption characteristics of each of developed color dyes of cyan, magenta, and yellow in the photosensitive material, there exist wavelength regions (wavelength regions Q1, Q2 in FIG. 1) with absorptions by a plurality of developed color dyes. In order to determine the density of one developed color dye in this wavelength region, absorptions due to the developed color dyes other than the above developed color dye are eliminated to be corrected.

Thus, the wavelength region deviated from the peak in the spectral absorption distribution of one developed color dye is set outside of the region of the spectral absorption distribution of other developed color dyes, so that corrections to eliminate absorptions due to the developed color dyes other than the intended developed color dye are not necessary. Accordingly, it is possible to alleviate the processing load and carry out processing efficiently.

Now, the above described original is constituted by a photosensitive material having at least three types of photosensitive layers, on a support, containing at least a photosensitive silver halide, a binder, and coloring materials which have functions to release or diffuse diffusible dyes imagewisely, upon silver development, coated thereon, wherein the photosensitive wavelength regions and color hues of the coloring materials after development of the photosensitive layers are different from each other.

When a heat-developing photosensitive material containing the coloring material as described above (hereinafter referred to as "heat-developing photosensitive material containing coloring materials") is used, for example, the heat developing photosensitive material containing coloring material is imagewisely exposed, the exposed heat-developing photosensitive material containing coloring materials is superposed on a processing material having a layer containing at least a mordant on a support. The superposed heat-developing photosensitive material containing coloring materials and the processing material are heated, and part or whole of the diffusible dye released by heating is removed from the heat-developing photosensitive materials containing coloring materials, thereby forming a color image of at least three colors on the heat-developing photosensitive material containing coloring materials.

The original can be constituted by a photosensitive material having at least three types of photosensitive layers containing at least a photosensitive silver halide, a binder and dye-providing couplers, on a support, wherein the photosensitive wavelength regions and the dyes formed by the dye-providing couplers of the three types of the photosensitive layers are different from each other.

When the above-described heat-developing photosensitive material containing the coupler (hereinafter referred to as "heat-developing photosensitive material containing coupler") is used, for example, the heat-developing photosensitive material containing coupler is imagewisely exposed, and the exposed heat-developing photosensitive material containing coupler is superposed on a processing material for heat development used for forming an image on the heat-developing photosensitive material containing coupler by superposing and heating together with the photosensitive material containing coupler thereafter, the superposed heat-developing photosensitive material containing coupler and the processing material for heat development are heated to form a color image comprising at least three colors on the heat developing photosensitive material containing coupler.

FIG. 8B shows the density versus exposure characteristics in the heat-developing photosensitive material containing coloring materials and the heat developing photosensitive material containing couplers. This density of the density versus exposure characteristics of FIG. 8B shows an accumulated density of the density (1) arising from residual unexposed silver halide crystals, the density (2) arising from silver generated by exposure, and the density (3) attributed to a developed color dye similar to the density of the density versus exposure characteristics in conventional negative film as shown in FIG. 8A. That is, as compared to the conventional negative film, the density range is quite wide, and it is necessary to read high density range with high accuracy.

When an image recorded on the above-described heat-developing photosensitive material containing coloring materials and heat-developing photosensitive material containing couplers is read, as in the case of this invention, it is effective to set density range to be read in a plurality of wavelengths to read the image.

FIG. 9 shows the spectral absorption characteristics of each of developed color dyes of cyan, magenta, and yellow in the heat-developing photosensitive material containing coloring material or heat-developing photosensitive material containing coupler. The density in the spectral absorption characteristics consists of three elements of the density (1) arising from the residual unexposed silver halide crystals, the density (2) arising from silver formed by exposure, and the density (3) attributed to a developed color dye. The densities (1) and (2) are nearly constant irrespective of wavelengths. In the spectral absorption characteristics of each of developed color dyes of cyan, magenta and yellow, the density of cyan color is read at wavelengths $\lambda_{C1}$ and $\lambda_{C2}$, the density of magenta color is read at wavelengths $\lambda_{M1}$ and $\lambda_{M2}$, and the density of yellow color is read at wavelengths $\lambda_{Y1}$ and $\lambda_{Y2}$.

Accordingly, when the images recorded on the heat-developing photosensitive material containing coloring materials or the heat-developing photosensitive material containing couplers are read in accordance with the image reading method of the present invention, a density in a wide range, in particular, a high density can be read with high accuracy. That is, the effect for improving the accuracy of image reading according to the present invention is remarkably exerted.

As described above, according to the present invention, it is not necessary to read an image (determine density of each color of an image) in the maximum density range as a detection range simultaneously in one wavelength region. Accordingly, effects in that it is not necessary to take a long time to read the image by using highly expensive special circuit parts, and the image can be read efficiently with simple apparatus structure, are obtained.

Effects can be obtained in that an image can be read with a high resolution and accuracy (that is, high SN ratio) by dividing the maximum density range in plural numbers and determining the density of each color at the divided small detection range.

In particular, the wavelength region outside the predetermined wavelength region containing the wavelength at which the absorbance of a developed color dye is maximum is made to be contained within the absorption wavelength region of the developed color dye to be determined, so that the correction for eliminating the absorption attributed to other developed color dyes is not necessary. Consequently, processing loads can be alleviated and processing can effectively performed.

BRIEF DESCRIPTION OF THE DRAWINGS

FIG. 3 is a schematic block diagram showing the structure of the image reading apparatus of the present invention.

FIG. 5 is a flow chart showing a control routine for reading processing of frame images of a negative film executed by the control section;

FIG. 7 is a diagram showing an example of dividing density range in case that the maximum density range is divided into three by light of three wavelengths for image reading processing;

DESCRIPTION OF THE PREFERRED EMBODIMENTS

Figure 4:
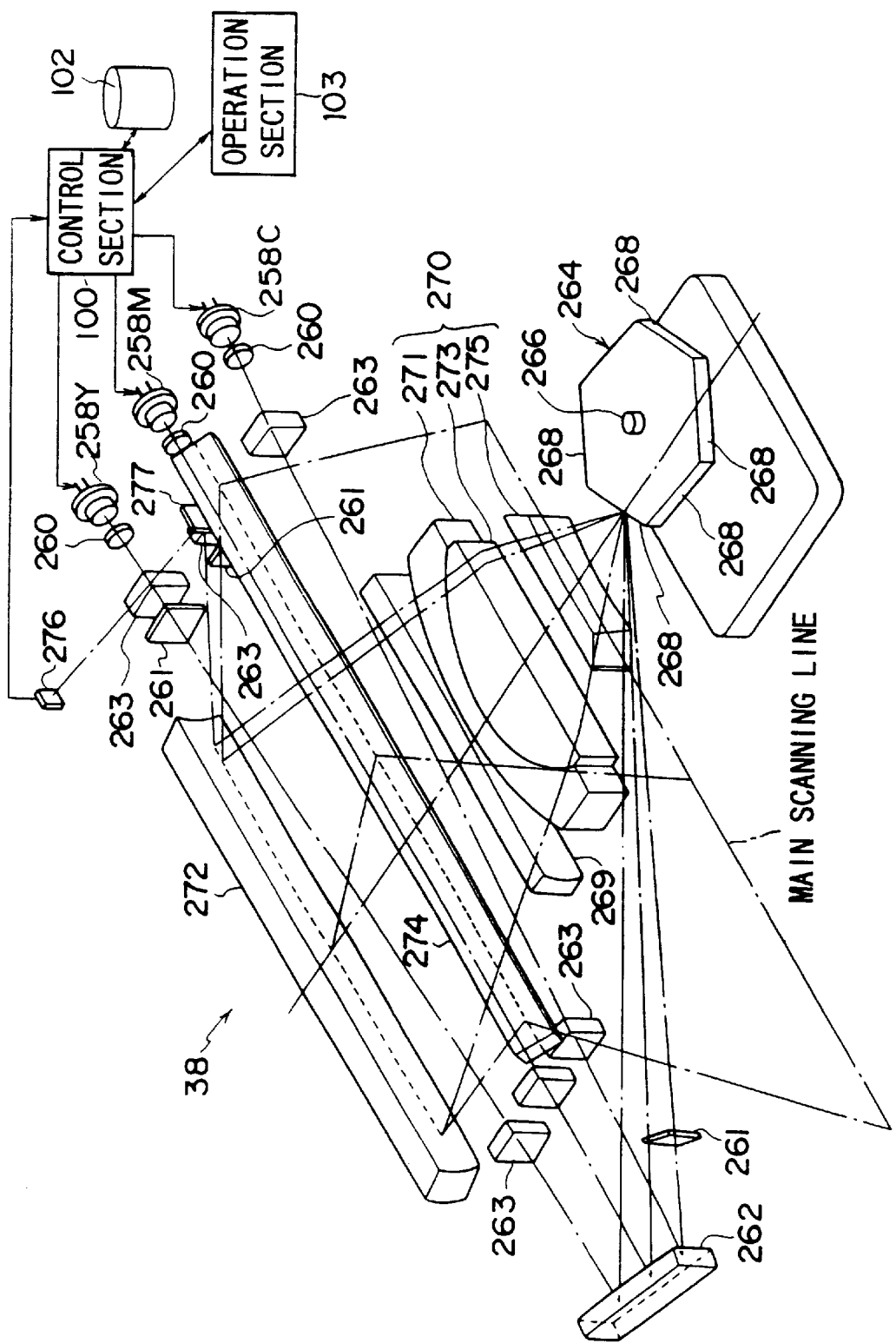
FIG. 4 is a schematic structural drawing of an optical scanning section.

Referring now to drawings, for embodiments related to the present invention, an example in which images (frame images) recorded in each frame of a developed film are read by the image reading method according to the present invention will be explained. Referring to FIGS. 3 and 4, a structure of an image reading apparatus 10 for executing the image reading method according to the present invention will be explained.

As shown in FIG. 3, an optical scanning section 38 for scanning a frame image in a film N disposed at a predetermined reading position with an optical beam along the predetermined main scanning direction (in the direction of Arrow U in FIG. 3) is disposed in an image reading apparatus 10.

As shown in FIG. 4, a semiconductor laser 258C as a light source for detecting the density of developed cyan color dye, a semiconductor laser 258M as a light source for detecting the density of developed magenta color dye, and a semiconductor laser 258Y as a light source for detecting the density of developed yellow color dye are arranged in the optical scanning section 38.

A control section 100 for controlling the wavelength and intensity of a light beam emitted from each semiconductor laser is connected to these semiconductor lasers 258C, 258M and 258Y. The control section 100 is comprised of an unillustrated microcomputer and executes the control routine of reading processing for frame images, which will be explained later. The wavelength of the light beam can be converted by the use of a wavelength converting element (SHG) (not illustrated).

On the other hand, in the vicinity of the emitting side of semiconductor lasers 258C, 258M and 258Y, collimator lenses 260 are disposed, respectively, for converting the light beam emitted from each of semiconductor lasers 258C, 258M and 258Y from a diffuse beam to a parallel beam. Each light beam converted to a parallel beam by the collimator lens 260 is incident on a reflecting mirror 262 via a cylindrical lens group 263 and a light quantity adjusting filter 261, is reflected by the reflecting mirror 262, and is focused on the reflection surface 268 of a polygon mirror 264. The cylindrical lens 263 serves for shaping the light-beam in the sub-scanning direction.

The polygon mirror 264 has six reflection surfaces 268 and rotates at a high speed (for an example, 125 revolutions per second) around a shaft 266 by the driving force from a motor (not illustrated), and serves for continuously deflecting the incident angle of the light beam on each reflecting surface 268. That is, the polygon mirror 264 deflects the light beam, and scans along the main scanning direction (in the direction of Arrow U in FIG. 3).

In the progressing direction of the light beam deflected by the polygon mirror 264, an f$^\theta$ lens system 270 is disposed for optically adjusting the image focusing point of the deflected light beam on the film N in FIG. 3 so that the point moves at a uniform speed along the main scanning direction. The f$^\theta$ lens system 270 is composed of lenses 271, 273 and 275.

In the progressing direction of the light beam transmitted through the f$^\theta$ lens system 270, a cylindrical lens 269 and a cylindrical mirror 272 are disposed in this order, and in the progressing direction of the light beam reflected by the cylindrical mirror 272, a reflecting mirror 274 is disposed. The reflecting mirror 274 is tilted at a predetermined angle so as to reflect the light beam downwards in the approximate vertical direction on the surface of the mirror 274.

An SOS (Start Of Scan) mirror 277 is disposed at the side of the reflecting mirror 274 so that the mirror 274 is first irradiated with the light beam reflected by the polygon mirror 264. A first light beam irradiated (light beam corresponding to the vicinity of the main scanning start point) is reflected by the SOS mirror 277 and is incident upon an SOS sensor 276. The SOS sensor 276 outputs a predetermined signal when the light beam from the SOS mirror 277 is incident thereupon, and the outputted signal is inputted into the control section 100, and the SOS is detected by the control section 100.

A reading position of the film N is provided as shown in FIG. 3, in the direction of the light beam emitted from the optical scanning section 38. The film N is transported by transporting rollers (not illustrated) in the sub-scanning direction (front side of the paper of FIG. 3) perpendicular to the main scanning direction of Arrow U. The transporting operation of the film N is controlled by the control section 100.

A color CCD line sensor 12 is disposed under the reading position of film N and the CCD line sensor 12 detects the quantity of light emitted from the optical scanning section 38 and transmitted through the frame image of the film N. The output terminal of the CCD line sensor 12 is connected to amplifiers 14 and 16, respectively, and each of the output terminals of the amplifiers 14 and 16 is connected to an multiplexer 18. The output terminal of the multiplexer 18 is connected to an analog-digital converter 20 (hereinafter referred to as "A/D converter"), and digital signals outputted from the A/D converter 20 are inputted to the control section 100.

That is, after analog signals corresponding to the quantity of transmitted light detected by the CCD line censor 12 are amplified by the amplifier 14 or amplifier 16, the signals are converted to digital signals by the A/D converter 20 and inputted into the control section 100.

The light beam emitted from the optical scanning section 38 scans the film N in the main scanning direction and the film N is transported in the sub-scanning direction so that the frame image of the film N is two-dimensionally scanned by the optical beam.

At the control section 100, the frame an absorbance of the light beam with image is determined on the basis of the quantity of light transmitted through the frame image detected by the CCD line sensor 12 as described above.

For example, by irradiating the frame image with the light beams of the same wavelength as the peak wavelength in the spectral absorption distribution of a developed cyan color dye, the light beam is absorbed by the developed cyan color dye in accordance with the absorbance of the cyan color at the irradiated point of the frame image, and the quantity of light which is not absorbed is detected by the CCD line sensor 12. That is, the absorbance attributed to the developed cyan color dye at the irradiated point is determined on the basis of the quantity of light (quantity of light which is not absorbed) detected by the CCD line sensor 12 at the control section 100, and further, the cyan color density at the irradiated point of the frame image can be determined by the obtained absorbance.

The densities of magenta and yellow colors at the irradiated point of the frame images can be determined at the control section 100, and the colors at the irradiated point can be determined based on the densities of the three colors at the irradiated point. The frame image can be read by determining the color of each color pixel based on the densities of the three colors obtained by scanning the entire frame images as described above.

As shown in FIG. 3, a magnetic disc apparatus 102 for storing the densities and the like of three colors determined as above, and an operation section 103 composed of a keyboard, buttons, etc. (not illustrated) for an operator to give instructions for operations such as start, stop, and the like in various processing are connected to the control section 100.

Next, the operation of this embodiment is explained. When the operator instructs to start the frame image reading processing with the operation section 103 after the operator sets the leading end of a film N to be measured onto a predetermined position, the control section 100 starts the execution of the control routine shown in FIG. 5.

In step 122 in FIG. 5, the film N is transported and the polygon 264 in the optical scanning section 38 is driven to be rotated. With this operation, the film N is transported in the sub-scanning direction (front side of the paper in FIG. 3). In the following step 124, the film N is monitored whether the first frame of the film N reaches the reading position or not. When the first frame reaches the reading position, the transport of film N is stopped at step 126, and the first frame is positioned at the reading position.

Figure 6:
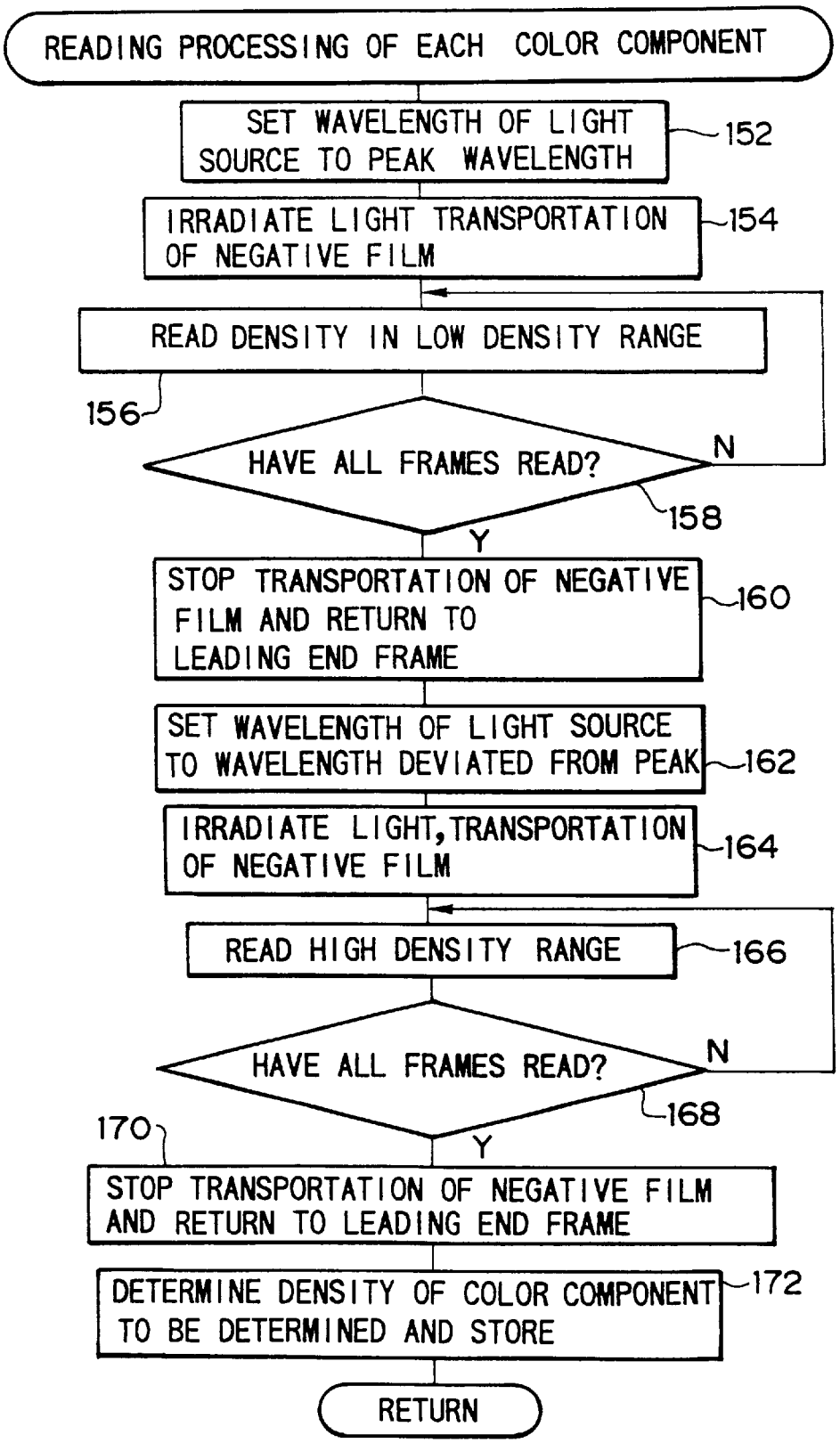
FIG. 6 is a flow chart showing a subroutine of the reading processing of each color component.

In the next step 128, the reading processing subroutine (see FIG. 6) for cyan color component of the image recorded in the first frame as positioned above is executed. In step 152 of FIG. 6, the wavelength of the light source (here, the semiconductor laser 258C) is set to the peak wavelength $\lambda_{C1}$ in the spectral absorption distribution of the developed cyan color dye of FIG. 1, and in the next step 154, the light having the peak wavelength $\lambda_{C1}$ from the semiconductor laser 258C is applied to the frame image of the film N. The light having the peak wavelength $\lambda_{C1}$ scans in the main scanning direction is shown by Arrow U in FIG. 3 by deflected by the rotating polygon 264.

In step 154, the film N is transported in the sub-scanning direction at a predetermined speed, and the frame image of the first frame positioned as above is two-dimensionally scanned by the light having the peak wavelength $\lambda_{C1}$.

The light having the peak wavelength $\lambda_{C1}$ for scanning the image of the first frame is absorbed by the layer containing the developed cyan color dye in the film N in the quantity of light corresponding to the cyan color density of the frame image, and the quantity of light which is not absorbed is detected by the CCD line sensor 12. In the next step 156, the density range of 0–2 as a predetermined low density range as a detection range is digitalized with a predetermined members of bits (for an example, 12 bits) and the cyan color density is determined on the basis of the detected value of the quantity of light of the frame image by the CCD line sensor 12.

The reading of the cyan color density based on the detected value of the quantity of light of the frame image is executed for the entire frame images to be determined (step 158). When reading of the entire frame images (detection of the cyan color density) is completed in the density range of 0–2 as a detection range, the process proceeds to step 160, and the transportation of the film N is stopped and the film N is transported in the reverse direction. Thereafter, the leading end of the frame to be read (here the first frame) is returned to the reading start position.

In the next step 162, the wavelength of the light source (the semiconductor laser 258C) is set to the wavelength $\lambda_{C2}$ which is deviated from the peak wavelength in the spectral characteristics of the developed cyan color dye in FIG. 1, and in the following step 164, the light beam of the wavelength $\lambda_{C2}$ irradiates the frame image of the film N from the semiconductor laser 258C, and scans in the main scanning direction as shown by an arrow U in FIG. 3. In the step 164, the film N is transported in the sub-scanning direction at a predetermined speed. Thus, the image of the first frame is two-dimensionally scanned by the light beam of wavelength $\lambda_{C2}$.

The light beam of wavelength $\lambda_{C2}$ for scanning the image of the first frame is absorbed by the layer containing the developed cyan color dye in the film N in a quantity of light corresponding to the cyan color density of the frame image, and the quantity of light which is not absorbed is detected by the CCD line sensor 12. In the next step 166, the density range of 1–1.75 in the predetermined high density range as a detection range is digitalized with a predetermined bits (for an example, 12 bits) and the cyan color density is determined on the basis of the detection value of the quantity of light transmitted through the frame image by the CCD line sensor 12.

The determination of the cyan color density based on the detection value of the quantity of light transmitted through the frame image is carried out for the entire frame images (step 168). When the reading of the entire frame images detection of the cyan color density is completed in the density range of 1–1.75 as a detection range, the process proceeds to step 170, and the transportation of the film N is stopped. The film N is then transported in the reverse direction, and the leading end of the frame (here, the first frame) is returned to the reading start position.

In the next step 172, the detected results of the cyan color density of the entire frame images in the density range of 1–1.75 set as a detection range are doubled to convert the results to the cyan color density in the density range of 2–3.5 set as a detection range. In addition, the density of the color component (cyan color component, in this instance) in each pixel of the frame images to be determined is determined based on the converted cyan color density and the detected results in the density range of 0–2 set as a detection range. The density range of 0–3.5 is divided into two as above and the density in each density range is digitized with 12 bits to determine the density of the cyan color component. Accordingly, this corresponds to the process in that the density range of 0–3.5 is digitized with 13 bits as a whole and the density of the cyan color component is determined accurately with a high resolution.

In addition, in step 172, the density of the color component to be determined (cyan color component, in this instance) in each pixel in the frame images is stored in the magnetic disc apparatus 102, and the process is returned to the main routine in FIG. 5.

In FIG. 5, in the next step 130, the reading processing similar to the reading processing of the cyan color component is carried out for magenta color component, and the density of the magenta color component of each pixel of the frame image obtained as processed results is stored in the magnetic disc apparatus 102. In the next step 132, the reading processing similar to the reading processing of the cyan color component is carried out for yellow color component, and the density of the yellow color component in each pixel of the frame image obtained as processed results is stored in the magnetic disc apparatus 102.

The density of each color component of cyan, magenta and yellow in each pixel of the first frame image can be determined and stored in the magnetic disc apparatus 102 through the processing of steps 128–132 above.

In the following step 134, whether the reading processing for all the frames of the film N is finished is judged, and the process proceeds to step 136 until the reading processing for all the frames is finished, and the film N is transported in order to position the succeeding frame to the reading position, and thereafter, the process returns to step 124.

Thereafter, the frame of film N is set for each frame to the reading position, and the reading processing for each color component of steps 128–132 for each image frame is executed. By these processes, reading results for each color component for each frame image of the film N, that is, information regarding the density of each color component of cyan, magenta and yellow in each pixel of the frame image (digital data) is stored in the magnetic disc apparatus 102.

When the reading processing is finished for all the frames, an acceptance judgment is made at step 134, and the control routine is finished.

According to the above-mentioned reading processing, each frame image of the film N is read for each color component, and the reading results are stored in the magnetic disc apparatus 102. The frame image of the original film N can be reproduced with high accuracy by reading the information on the density of each color component in each pixel of the frame image from the magnetic disc apparatus 102 and by reproducing and superimposing the three-color component densities of each pixel of the frame image based on the information.

According to the embodiment described as above, since it is not necessary to read a frame image at one time in the maximum density range of 0–3.5 as a detection range, it is not necessary to take time to read it using expensive special circuit parts, and the frame image can be efficiently read with a simple apparatus construction.

The density can be determined more accurately with a higher resolution according to this embodiment in which the density is determined by digitizing with 12 bits for each density range as a detection range defined by dividing the density range of 0–3.5 than the conventional method in which the density is determined by digitizing with 12 bits for the whole density range of 0–3.5 as a detection range by the use of the light of the absorption peak wavelength of one developed color dye (for example, peak wavelength $\lambda_{C1}$ etc. of developed cyan color dye).

Figure 1:
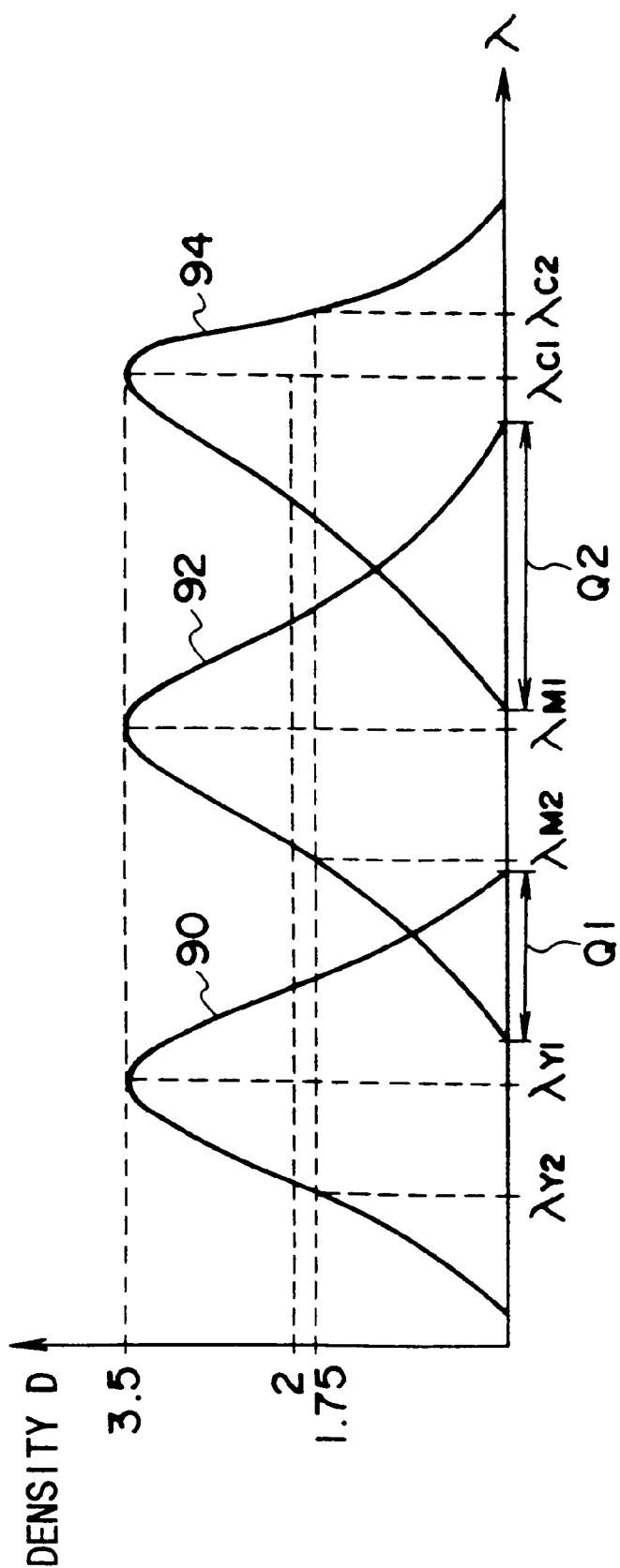
FIG. 1 is a diagram showing spectral absorption characteristics of each of developed color dyes of cyan, magenta and yellow.
Figure 2:
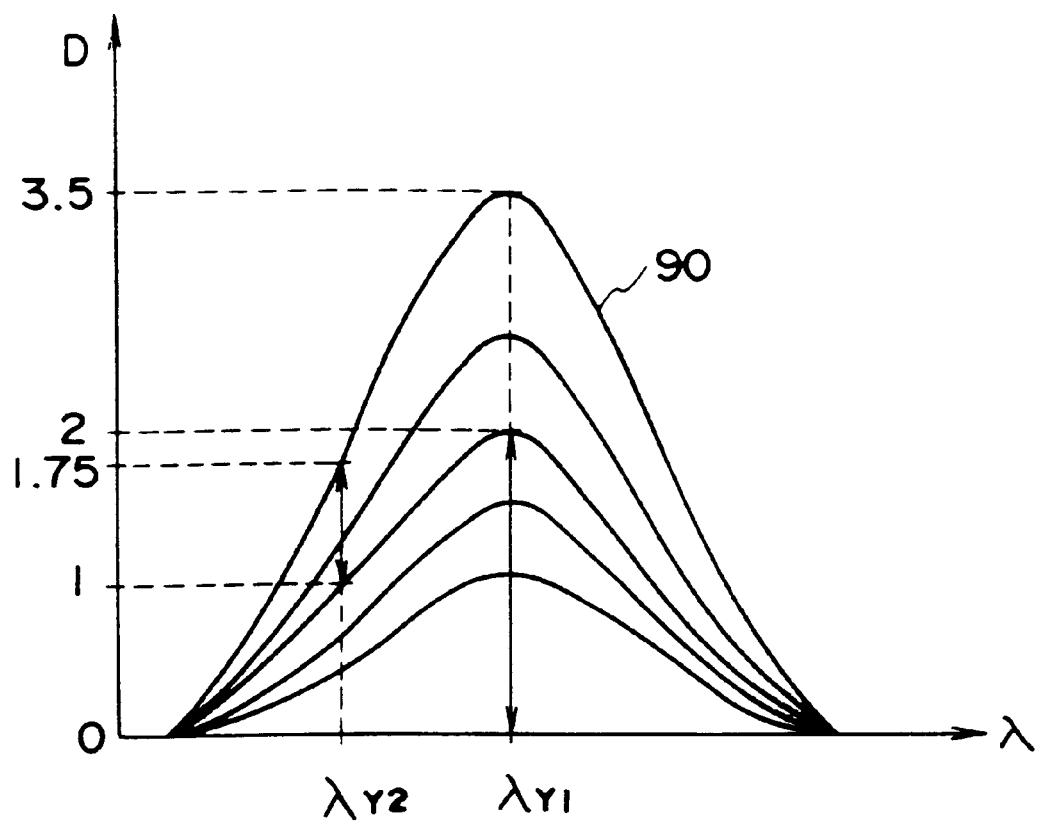
FIG. 2 is a diagram showing that densities vary with approximate similar figures in the spectral absorption characteristics of a developed yellow color dye.

In this embodiment, as is clear from the diagram in FIG. 1, the wavelength $\lambda_{C2}$ deviated from the peak wavelength in the spectral absorption characteristics of the developed cyan color dye is set to the wavelength outside the spectral absorption distribution range of each developed color dye of magenta and yellow other than the developed cyan color dye. Similarly, the wavelength $\lambda_{M2}$ deviated from the peak wavelength in the spectral absorption characteristics of the developed magenta color dye or the wavelength $\lambda_{Y2}$ deviated from the peak wavelength in the spectral absorption characteristics of the developed yellow color dye is set to the wavelength outside the spectral absorption distribution range of other developed color dyes. Thus, it is not necessary to correct the quantities of lights absorbed by developed color dyes other than the dye to be determined, and the load of reading processing is alleviated, and the reading processing can be carried out efficiently.

In this embodiment, as a means to convert the wavelength from wavelength $\lambda_{C1}$ to $\lambda_{C2}$, the temperature of the semiconductor laser may be changed or other semiconductor lasers having different emission wavelengths (not illustrated) may be provided for three colors, respectively. That is, six semiconductor lasers in total may be provided for emitting a laser beam of wavelength $\lambda_{C1}$, a laser beam of wavelength $\lambda_{C2}$, a laser beam of wavelength $\lambda_{M1}$, a laser beam of wavelength $\lambda_{M2}$, a laser beam of wavelength $\lambda_{Y1}$, and a laser beam of wavelength $\lambda_{Y2}$, respectively.

Further, a white light source and six filters are provided and the white light may be separated by the use of these filters to obtain lights having six wavelengths.

Now, it is sometimes difficult to set the wavelength deviated from the peak wavelength in the spectral absorption characteristics of one developed color dye to the wavelength outside the spectral absorption distribution regions of other developed color dyes depending on photosensitive materials. In such event, information regarding the spectral absorption characteristics as shown in the diagram of FIG. 1 is stored in the look-up table (LUT) beforehand and the ratio of light absorbed by other developed color dyes which are not to be determined is determined with reference to the information of the spectral absorption characteristics, and corrections are made by subtracting the quantity corresponding to the ratio, or the like.

The photosensitive material of the film N and the like deteriorates with time, and the performance of the semiconductor lasers 258C, 258M and 258Y of the light scanning portion 38 also deteriorates. Therefore, it is desirable to correct the spectral absorption characteristics with the light of the peak wavelength and the spectral absorption characteristics with the light of the wavelength deviated from the peak wavelength in the image reading apparatus 10 before carrying out reading processing, or at regular intervals.

For example, using a reference negative film on which reference patterns are recorded in each color of cyan, magenta and yellow colors having a predetermined density, the density of each color of the reference patterns is detected by use of light having the peak wavelength for the low density range set as a detection range and the density of each color of the reference patterns is detected by use of light having wavelength deviated from the peak wavelength for the high density range set as a detection range, and based on the detection results, the spectral absorption characteristics by use of the light of the peak wavelength and the spectral absorption characteristics by use of the light of wavelength deviated from the peak wavelength may be corrected.

In the event of the above correction, it is desirable that the detection range with the light having the peak wavelength and the detection range with the light having a wavelength deviated from the peak wavelength overlap each other, because the correction can be made more accurately in the overlapped range.

Now, in the above embodiment, an example in which the maximum density range of 0–3.5 is divided into two and reading processing is carried out by use of the light of the peak wavelength in the spectral absorption distribution of each developed color dye and the light of the wavelength deviated from the peak wavelength, but the maximum density range may be divided into multiple portions by use of lights having three or more wavelengths, and reading processing may be carried out. For example, in the spectral characteristics of the developed yellow color dye as shown in FIG. 7, reading processings may be carried out by use of light of peak wavelength $\lambda_{Y1}$ for a low density range (0–1.5) as a detection range, by use of light of the wavelength deviated from the peak wavelength $\lambda_{Y2}$ for a medium density range (1.5–2.5) as a detection range, and by use of light of the wavelength deviated from the peak wavelength $\lambda_{Y3}$ for a high density range (2.5–3.5) as a detection range, respectively.

In the above embodiment, description is made on the reading processing for each frame image recorded on the film N as a color negative film, but the image reading method according to the present invention can be applied to the reading processing of the image recorded on other photosensitive materials such as a reversal film, other recording papers, and the like which have layers containing of the developed color dyes of cyan, magenta and yellow.

In addition, in the above embodiment, description is made on an example where optical beams are irradiated successively from semiconductor lasers, but lights may be irradiated simultaneously from three semiconductor lasers and densities can be detected by the use of a color CCD.

Furthermore, in the above embodiment, description is made on an example where the density detected by the wavelength deviated from the peak wavelength is converted to the density at the peak wavelength by computation, but gains of AMPs 14 and 16 may be set to, for example, 1:2, and the detected values may be changed by switching in accordance with the peak wavelength and the wavelength deviated from peak wavelength.

This invention is not limited only to photographic fields, but is applicable to various fields for reading high density images whose spectral characteristics are not flat.

As the film N, a photosensitive material (a heat-developing photosensitive material containing coloring material) having at least three types of photosensitive layers containing a photosensitive silver halide, a binder, and coloring materials having functions for releasing or for diffusing diffusible dyes imagewisely, on a support, upon silver development the photosensitive wavelength regions and color hues after development of the coloring material being different from each other can be used.

Further, as the film N, it is possible to use a photosensitive material (a heat-developing photosensitive material containing coupler) having at least three types of photosensitive layers containing a photosensitive silver halide, a binder, and dye-donating couplers on a support, wherein the photosensitive wavelength regions and color hues formed from the dye-donating couplers are different from each other.

Figure 8:
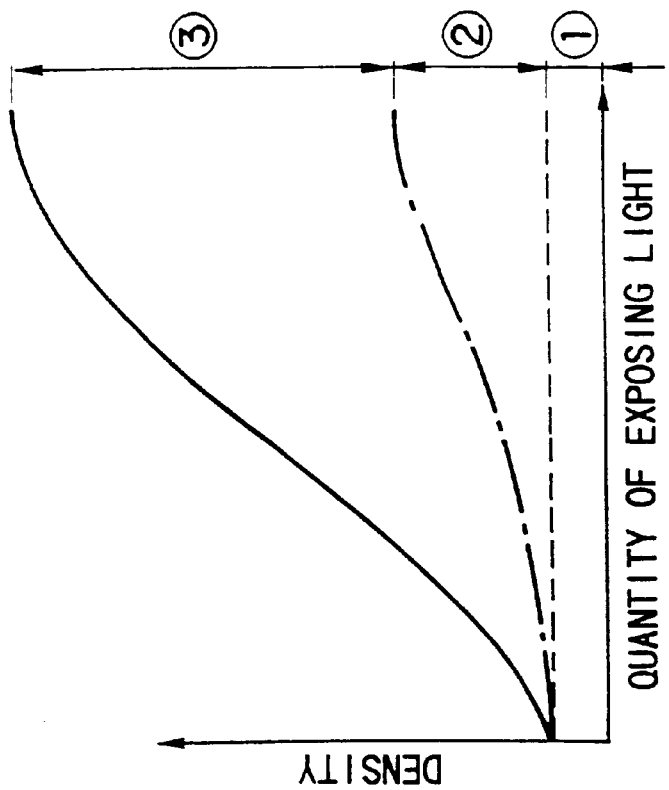
FIG. 8A is a graph showing a density versus exposure characteristic in a conventional negative film.
FIG. 8B is a graph showing a density versus exposure characteristic of a heat-developing photosensitive material containing coloring material or a heat-developing photosensitive material containing coupler.
Figure 8:
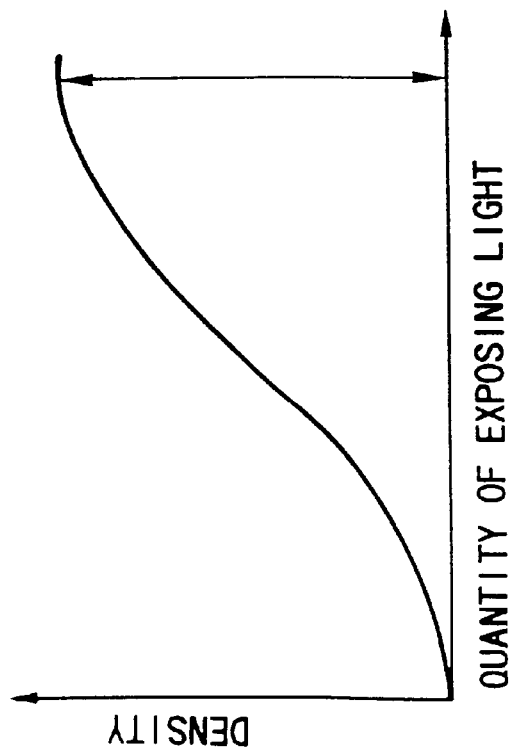

The density versus exposure characteristics (see FIG. 8B) in the above two types of photosensitive materials have a considerable wide range of densities as compared to those of conventional negative films as described above, the high density must be read with high accuracy.

Figure 9:
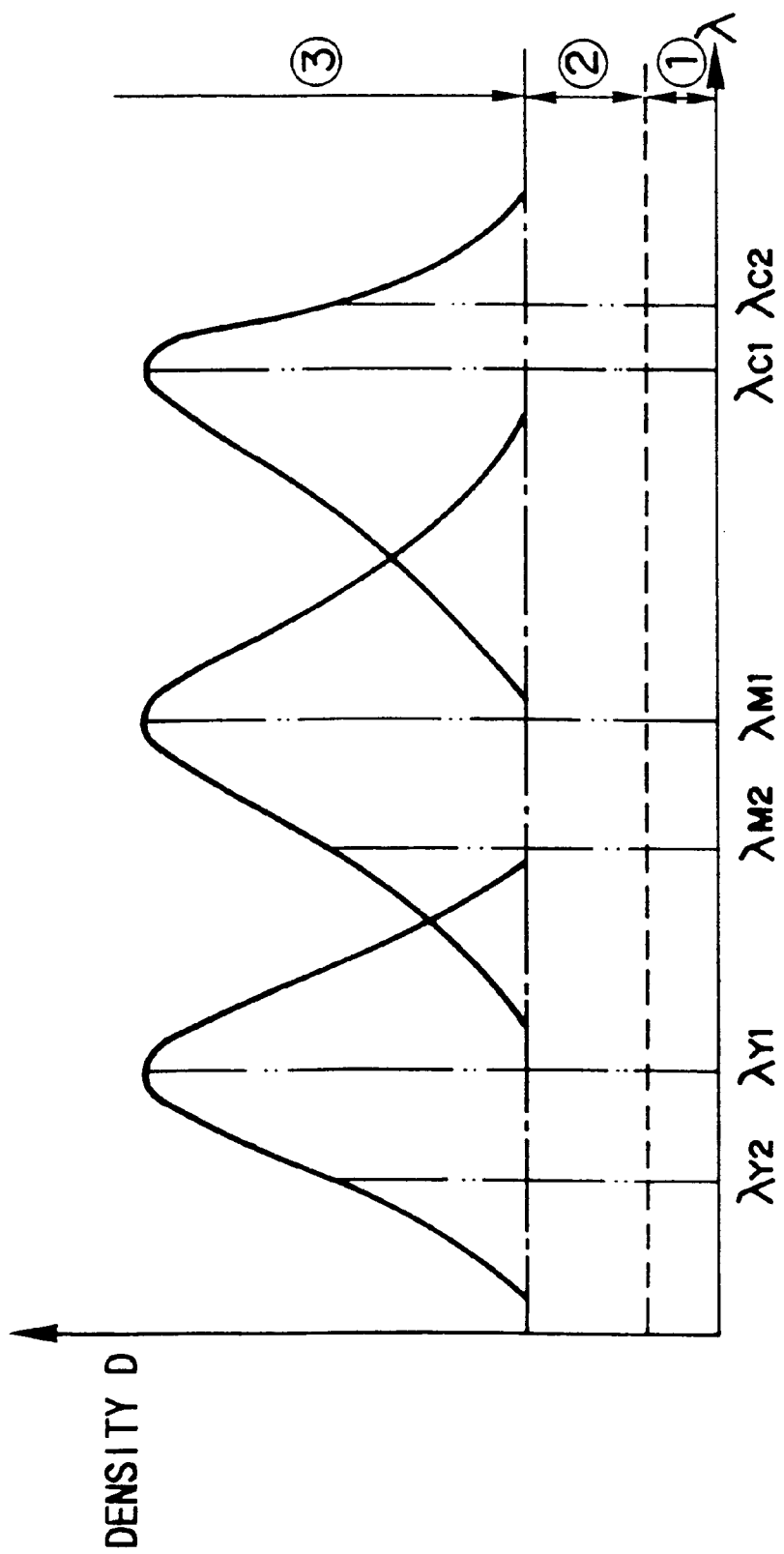
FIG. 9 is a drawing showing spectral absorption characteristics of developed color dyes of cyan, magenta and yellow in a heat-developing photosensitive material containing coloring material or a heat-developing photosensitive material containing coupler.

Therefore, when the images recorded on these photosensitive materials are read, in the spectral absorption characteristics of each of developed color dyes of cyan, magenta and yellow as shown in FIG. 9, the cyan color is controlled to be read with wavelength $\lambda_{C1}$ and wavelength $\lambda_{C2}$, the magenta color is controlled to be read with wavelength $\lambda_{M1}$ and wavelength $\lambda_{M2}$, and the yellow color is controlled to be read with wavelength $\lambda_{Y1}$ and wavelength $\lambda_{Y2}$, respectively.

By doing this, a wide range of densities, particularly, a high density, can be read at high accuracy, remarkably exhibiting the effects of this embodiment such that the accuracy of image reading can be improved.

In the above embodiment, a photosensitive material containing residual silver halide and developed silver is exemplified, but even when the image can be read after removing either or both of them through processing such as bleaching, etc., the image can be read with a good image quality to a high density.

What is claimed is:

1. An image reading method for reading density of each color of a color image recorded on an original, comprising the steps of:

irradiating the original with a plurality of light groups containing a plurality of lights having wavelength regions different from each other, each of which corresponds to each color, wherein each of the wavelength regions of the plurality of the light groups is contained in the absorption wavelength region of a developed color dye having a color which corresponds to the wavelength region, detecting the quantity of light reflected from the original or the quantity of light transmitted through the original for each wavelength region, and determining the density of each color of the image of the original on the basis of the detected quantity of light.

2. An image reading method according to claim 1 wherein at least one of the plurality of lights contained in each light group is a first light of the wavelength region within a predetermined region containing the wavelength where light absorbance of the developed color dye having a color corresponding to the first light is maximum, and the other of the plurality of lights is the light containing a second light of the wavelength region outside the predetermined region.

3. An image reading method according to claim 2, wherein the wavelength region outside the predetermined region is contained only within the absorption wavelength region of the developed color dye having a color corresponding to the wavelength region.

4. An image reading method according to claim 3, wherein the density of the first density range lower than the predetermined density of each color is determined on the basis of the quantity of light detected by irradiating the first light and the density of the second density range higher than the predetermined density of each color is determined on the basis of the quantity of light detected by irradiating the second light.

5. An image reading method according to claim 1 wherein the original comprises a photosensitive material having at least three types of photosensitive layers on a support, containing at least a photosensitive silver halide, a binder, and a coloring material having a function to release or diffuse a diffusible dye imagewisely, wherein the photosensitive wavelength regions and the color hues after development of the three types of the photosensitive layers are different from each other.

6. An image reading method according to claim 1 wherein the original comprises a photosensitive material having at least three types of photosensitive layers on a support, containing at least a photosensitive silver halide, a binder, and a dye-providing coupler, wherein the photosensitive wavelength regions of the photosensitive layers and the color hues of dyes formed by the dye-providing couplers are different from each other.

7. An image reading method for reading a density of each color of a color image recorded on an original, comprising the steps of:

irradiating the original with a plurality of light groups containing a plurality of lights having wavelength regions different from each other each of which corresponds to each color, wherein each of the wavelength regions of the plurality of the light groups is contained in the absorption wavelength region of a developed color dye having a color which corresponds to the wavelength region, detecting the quantity of light reflected from the original or the quantity of light transmitted through the original for each wavelength region, and determining the density of each color of the image of the original on the basis of the detected quantity of light, and further wherein at least one of the plurality of lights contained in each light group is a first light of the wavelength region within a predetermined region containing the wavelength where light absorbance of the developed color dye having a color corresponding to the first light is maximum, and the other of the plurality of lights is the light containing a second light of the wavelength region outside the predetermined region, and still further wherein:

the density of a first density range lower than a predetermined density of each color is determined on the basis of the quantity of light detected by irradiating the first light and the density of a second density range higher than the predetermined density of each color is determined on the basis of the quantity of light detected by irradiating the second light.

8. An image reading method for reading density of each color of an original composed of a color image recorded on a photosensitive material containing developed color dyes of cyan, magenta and yellow, comprising the steps of:

irradiating the photosensitive material with a plurality of light groups containing a first light having a wavelength region within a predetermined region containing the wavelength where the absorbance of each of the developed color dyes is maximum and a second light having a wavelength region outside the predetermined region, and each of the first light and the second light corresponds to each color, wherein the photosensitive material is irradiated with each of the light groups contained within each of the developed color dyes corresponding to each of the light groups, detecting the quantity of light reflected from the original or the quantity of light transmitted through the original for each wavelength region, and determining the density of the first density range lower than a predetermined density of each color on the basis of the quantity of light detected by irradiation of the first light and determining the density of the second density range higher than the predetermined density of each color on the basis of the quantity of light detected by the irradiation of the second light.

9. An image reading method according to claim 8, wherein the wavelength region outside the predetermined region is contained only in the absorption wavelength of the developed color dye corresponding to the wavelength region outside the predetermined region.

10. An image reading method according to claim 8, wherein the original comprises the photosensitive material having at least three types of photosensitive layers on a support, containing at least a photosensitive silver halide, a binder, and coloring materials having functions to release or diffuse diffusible dyes imagewisely, wherein the photosensitive wavelength regions and color hues of the coloring materials after developing the photosensitive material are different from each other.

11. An image reading method according to claim 8, wherein the original comprises the photosensitive material on a support, having at least three types of photosensitive layers containing at least a photosensitive silver halide, a binder and a dye-providing coupler, wherein the photosensitive wavelength regions of the photosensitive layers and color hues of dyes formed by the dye-providing coupler are different from each other.

12. An image reading apparatus for reading the density of each color of a color image recorded on an original, comprising:

a scanning means for scanning the original using a plurality of light groups which contain a plurality of lights having wavelength regions different from each other, each of which corresponds to each color, wherein each of the wavelength regions is contained in the absorption wavelength region of a developed color dye having a color which corresponds to the wavelength region, a photoelectric converting element for detecting the quantity of light reflected from the original or the quantity of light transmitted through the original for each wavelength region, and an arithmetic operation unit for computing the density of each color of the image of the original based on the detected quantity of light.

13. An image reading apparatus according to claim 12, wherein at least one of the plurality of lights contained in each light group is a first light having a wavelength region within a predetermined region including the wavelength where the absorbance of the developed color dye corresponding to at least one of the plurality of lights is maximum and the other is the light containing a second light having a wavelength region outside a predetermined wavelength region.

14. An image reading apparatus according to claim 13, wherein the wavelength region outside the predetermined wavelength region is contained only in the absorption wavelength region of the developed color dye corresponding to the wavelength region outside of the predetermined wavelength region.

15. An image reading apparatus according to claim 12, wherein the original comprises a photosensitive material having at least three types of photosensitive layers on a support, containing at least a photosensitive silver halide, a binder, and coloring materials having functions to release or diffuse diffusible dyes imagewisely, wherein photosensitive wavelength regions and color hues of the coloring materials after developing the photosensitive material are different from each other.

16. An image reading apparatus according to claim 12, wherein the original comprises a photosensitive material having at least three types of photosensitive layers on a support, containing at least a photosensitive silver halide, a binder, and dye-providing couplers, wherein the photosensitive wavelength regions of the photosensitive layers and color hues of dyes formed by the dye-providing couplers are different from each other.

17. An image reading apparatus for reading the density of each color of a color image recorded on an original, comprising:

a scanning means for scanning the original using a plurality of light groups which contain a plurality of lights having wavelength regions different from each other, each of which corresponds to each color, wherein each of the wavelength regions is contained in the absorption wavelength region of a developed color dye having a color which corresponds to the wavelength region, a photoelectric converting element for detecting the quantity of light reflected from the original or the quantity of light transmitted through the original for each wavelength region, and an arithmetic operation unit for computing the density of each color of the image of the original based on the detected quantity of light, and wherein at least one of the plurality of lights contained in each light group is a first light having a wavelength region within a predetermined region including the wavelength where the absorbance of the developed color dye corresponding to at least one of the plurality of lights is maximum and the other is the light containing a second light having a wavelength region outside a predetermined wavelength region, and still further wherein the density of a first density range lower than a predetermined density value of each color is determined on the basis of the quantity of light detected by irradiating the first light and the density of a second density range higher than the predetermined density value of each color is determined on the basis of the quantity of light detected by irradiating the second light.

* * * * *

UNITED STATES PATENT AND TRADEMARK OFFICE
CERTIFICATE OF CORRECTION

PATENT NO. : 6,043,907
DATED : March 28, 2000
INVENTOR(S) : Yoshiharu OKINO

It is certified that error appears in the above-identified patent and that said Letters Patent is hereby corrected as shown below:

On the Title Page  FILED: [Oct. 3, 1997] <u>Dec. 3, 1997</u>

Signed and Sealed this

Twenty-ninth Day of May, 2001

Attest:

NICHOLAS P. GODICI

*Attesting Officer*  *Acting Director of the United States Patent and Trademark Office*